United States Patent
Wright et al.

(10) Patent No.: US 7,912,617 B2
(45) Date of Patent: Mar. 22, 2011

(54) AIR PURGE METHOD FOR A ROTATING CLUTCH

(75) Inventors: David W. Wright, Howell, MI (US); Bryan J. Williams, Novi, MI (US); Scott R. Verna, Dexter, MI (US)

(73) Assignee: GM Global Technology Operations, Inc.

( * ) Notice: Subject to any disclaimer, the term of this patent is extended or adjusted under 35 U.S.C. 154(b) by 1497 days.

(21) Appl. No.: 11/300,087

(22) Filed: Dec. 14, 2005

(65) Prior Publication Data

US 2007/0135252 A1    Jun. 14, 2007

(51) Int. Cl.
- G06F 7/00      (2006.01)
- G06F 17/00     (2006.01)
- B60W 10/02     (2006.01)
- B60W 10/10     (2006.01)
- F16D 67/00     (2006.01)
- F16D 11/00     (2006.01)
- F16D 13/60     (2006.01)
- F16H 31/00     (2006.01)
- F16H 61/26     (2006.01)

(52) U.S. Cl. ...... 701/67; 192/109 F; 192/3.58; 475/121; 475/117; 477/158

(58) Field of Classification Search ............... None
See application file for complete search history.

(56) References Cited

U.S. PATENT DOCUMENTS

| | | | | |
|---|---|---|---|---|
| 4,337,787 A * | 7/1982 | Rhodes | ............ | 137/101 |
| 4,533,030 A * | 8/1985 | Gabriel | ............ | 477/89 |
| 4,662,249 A * | 5/1987 | Miki et al. | ............ | 477/132 |
| 4,724,724 A * | 2/1988 | Tezuka | ............ | 477/39 |
| 4,800,497 A * | 1/1989 | Koori et al. | ............ | 701/67 |
| 4,856,380 A * | 8/1989 | Murano et al. | ............ | 477/39 |
| 5,694,817 A * | 12/1997 | Reid | ............ | 74/606 R |
| 5,799,260 A * | 8/1998 | Droste et al. | ............ | 701/51 |
| 5,809,442 A * | 9/1998 | Schulz et al. | ............ | 701/51 |
| 5,908,460 A * | 6/1999 | Amisano et al. | ............ | 701/51 |
| 6,024,668 A * | 2/2000 | Holbrook et al. | ............ | 477/98 |
| 6,317,671 B1 * | 11/2001 | Tsutsui et al. | ............ | 701/51 |
| 6,840,888 B1 * | 1/2005 | Winquist et al. | ............ | 477/83 |
| 6,866,063 B2 * | 3/2005 | Avila | ............ | 137/596.17 |
| 7,447,582 B2 * | 11/2008 | Mori et al. | ............ | 701/51 |
| 2002/0082136 A1 * | 6/2002 | Endo et al. | ............ | 477/83 |
| 2004/0111205 A1 * | 6/2004 | Inoue et al. | ............ | 701/67 |
| 2005/0222735 A1 * | 10/2005 | Usuki et al. | ............ | 701/51 |
| 2005/0256625 A1 * | 11/2005 | Sah et al. | ............ | 701/67 |
| 2005/0256626 A1 * | 11/2005 | Hsieh et al. | ............ | 701/67 |
| 2006/0065509 A1 * | 3/2006 | Pritchard | ............ | 192/85 AA |

* cited by examiner

Primary Examiner — Khoi Tran
Assistant Examiner — Nicholas Kiswanto

(57) ABSTRACT

A method for controlling trapped air in a clutch of an automatic clutch-to-clutch transmission includes, calculating a pulse on time based on a clutch volume and adaptive convergence. A pulse off time is calculated based on a temperature of transmission fluid. A pulse number is calculated based on the temperature of transmission fluid. A maximum pressure is commanded to the clutch based on the pulse on time and a minimum pressure is then commanded to the clutch based on the pulse off time. A pulse counter is incremented when the pulse off time expires. The steps of commanding maximum pressure, then commanding minimum pressure, and incrementing the pulse counter are repeated until the pulse counter equals a desired pulse number.

7 Claims, 4 Drawing Sheets

| Gear | C1 | C2 | C3 | C4 | C5 |
|------|----|----|----|----|----|
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

Clutches Engaged

*Figure 2*

AIR PURGE METHOD FOR A ROTATING CLUTCH

FIELD OF THE INVENTION

The present invention relates to transmission control systems and methods, and more particularly to transmission control systems and methods that purge air from a clutch of the transmission.

BACKGROUND OF THE INVENTION

In an automatic transmission control valves supply hydraulic pressure to clutches and bands to engage each gear. A pump draws fluid from a sump in the bottom of the transmission and feeds it to the hydraulic system. Once the clutch is no longer required to be applied, the fluid is drained back to the sump. When the transmission is in park, neutral, or the engine is turned off, the pressurized fluid can be completely drained from the clutch and collected in a sump.

During this time, rotating clutches in a clutch-to-clutch transmission experience drain down issues that cause air to get into the clutch. Despite a bleed orifice, air becomes entrapped in the clutch. The trapped air causes the first shifts after complete drain down to flare. In order to eliminate air entrapped in the clutch it is desirable to purge air from the clutch of the transmission.

SUMMARY OF THE INVENTION

Accordingly, a method for controlling trapped air in a clutch of an automatic clutch-to-clutch transmission includes, calculating a pulse on time based on a learned clutch volume and an adaptive convergence state. A pulse off time and a pulse number are calculated based on a temperature of transmission fluid. A maximum pressure is commanded to the clutch based on the pulse on time and a minimum pressure is then commanded to the clutch based on the pulse off time. A pulse counter is incremented when the pulse off time expires. The steps of commanding maximum pressure, commanding minimum pressure, and incrementing the pulse counter are repeated until the pulse counter equals a desired pulse number.

In other features, the method is performed if enable conditions are met, and wherein the enable conditions are met if the method has not been performed during a key cycle. Alternatively, enable conditions are met if the transmission has operated in a range park or neutral for a selected period of time.

In another feature, the method is performed if the transmission is operating in a desired gear.

In still other features, the method comprises delaying a current upshift of the transmission while repeating is being performed, wherein delaying the upshift is not performed if engine speed indicates an overspeed condition.

In yet other features, subsequent upshifts are delayed after repeating is complete. Delaying is performed for each subsequent upshift, and wherein each subsequent upshift is delayed for a selectable amount of time. Delaying subsequent upshifts is not performed if engine speed indicates an overspeed condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a chart illustrating the required clutches to be engaged in order to achieve a desired gear for a six speed clutch-to-clutch transmission;

DETAILED DESCRIPTION OF THE PREFERRED EMBODIMENTS

Figure 1:
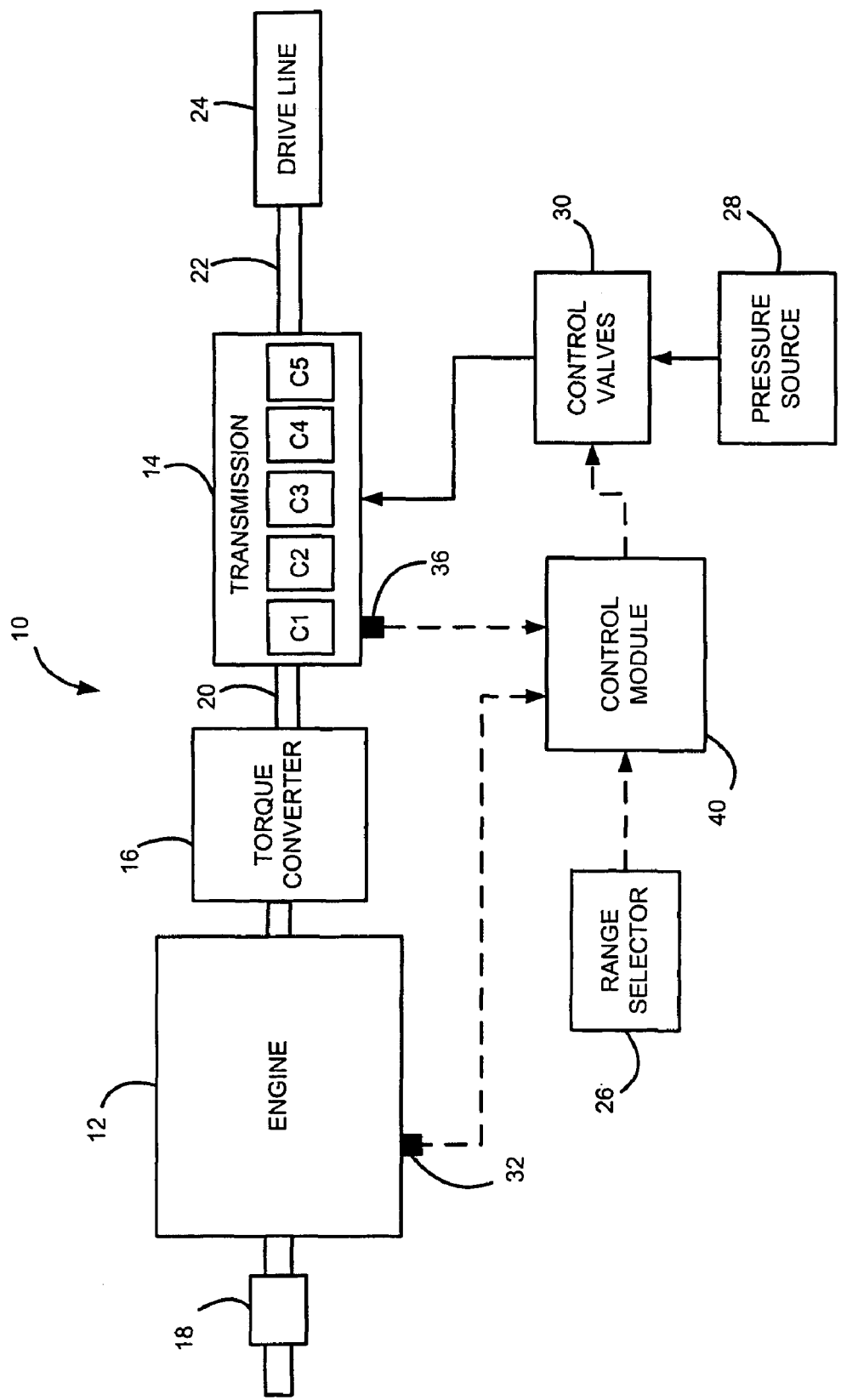
FIG. 1 is a schematic illustration of a vehicle including an air purge system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is shown generally at 10. The vehicle includes an engine 12 that drives a transmission 14 through a torque converter 16. Air is drawn into the engine 12 through a throttle 18. The air is mixed with fuel and combusted within cylinders (not shown) of the engine 12 to produce drive torque. The torque converter 16 supplies the engine torque to the transmission via an input shaft 20. The transmission 14 in the exemplary embodiment is a multi-speed, automatic, clutch-to-clutch transmission that drives an output shaft 22 based on engine torque.

The output shaft 22 drives a driveline 24 of the vehicle 10. A range selection device 26 enables an operator to set the transmission 14 at a desired operating range including, but not limited to, park, reverse, neutral, and one or more forward drive positions. The speed and torque relationships between the engine 12 and the driveline 24 are controlled by hydraulically operated clutches C1, C2, C3, C4, and C5 of the transmission 14. Pressurized fluid is provided to the clutches from a regulated hydraulic pressure source 28. The clutches C1, C2, C3, C4, and C5 are coupled to the hydraulic pressure source via control valves 30, which regulate clutch pressure by supplying or discharging fluid to/from the clutches C1, C2, C3, C4, and C5.

Referring now to FIG. 2, in the exemplary transmission, the five clutches C1, C2, C3, C4 and C5 are selectively engaged to provide neutral, six forward drive ratios, and one reverse drive ratio. Although the exemplary automatic transmission 14 includes six forward drive ratios and one reverse drive ratio, it is appreciated that the air purge method and system for a rotating clutch according to the present invention can be implemented in automatic transmissions having more or fewer drive ratios.

The table of FIG. 2 illustrates an exemplary combination of engaged clutches to establish the various drive ratios. Each drive ratio relates to an automatic gear of the transmission where the gears for a six speed automatic transmission are first, second, third, fourth, fifth and sixth. The first forward drive ratio is established by engaging the first clutch C1 and the fifth clutch C5. The second forward drive ratio is established by disengaging the fifth clutch C5 and substantially simultaneously engaging the fourth clutch C4. To establish the third forward drive ratio, the fourth clutch C4 is disengaged as the third clutch C3 is engaged. The fourth forward drive ratio is established by disengaging the third clutch C3 while engaging the second clutch C2. To establish the fifth forward drive ratio, the first clutch C1 is disengaged as the third clutch C3 is substantially simultaneously engaged. The sixth forward drive ratio is established by disengaging the third clutch C3 and simultaneously engaging the fourth clutch C4. The reverse drive ratio is established by engaging the third clutch C3 and the fifth clutch C5. The transmission 14 is in neutral when only the fifth clutch C5 is engaged.

Referring back to FIG. 1, a speed sensor 32 senses a rotational speed of the engine 12 and generates an engine speed signal. A temperature sensor 36 senses a temperature of the transmission fluid and generates a transmission temperature signal. The range selection device 26 generates a range signal. A control module 40 receives the above mentioned signals. The control module 40 controls the operation of the control valves 30 in order to pulse on and off clutches of the transmission 14. The control module 40 pulses a clutch based on the received signals and the air purge method of the present invention. In an exemplary embodiment, the control module 40 pulses C3 a determined number of times while the transmission 14 is operating in first and second gear, before the transmission 14 reaches third gear.

Figure 3:
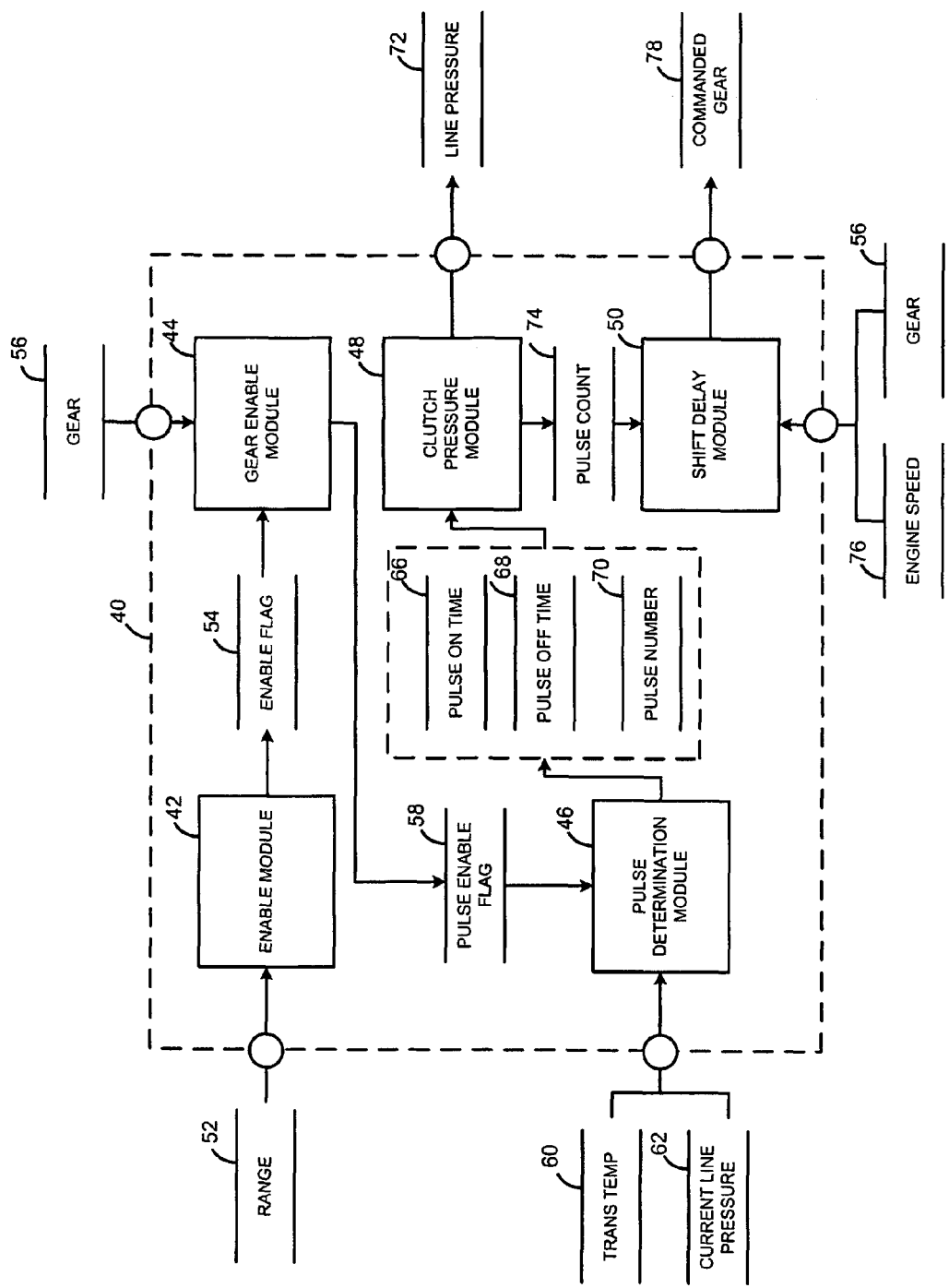
FIG. 3 is a data flow diagram illustrating a control module of the air purge system.

Referring to FIG. 3, FIG. 3 is a data flow diagram illustrating sub-modules and data-flows of the control module 40 of the present invention. The control module 40 includes an enable module 42, a gear enable module 44, a pulse determination module 46, a clutch pressure module 48, and a shift delay module 50. The enable module 42 receives the range signal 52 from the range selection device 26 (FIG. 1). The enable module 42 determines whether the air purge method has already run this key cycle. If the air purge method has not run, the enable module enables the air purge method by setting an enable flag 54 to TRUE. If the air purge method has already run once this key cycle but the transmission range 52 indicates park or neutral for a selectable period of time during the key cycle, the enable module 42 re-enables the air purge method by setting the enable flag 54 to TRUE.

Gear enable module 44 receives a transmission gear 56 determined from the ratio of the transmission 14 (FIG. 1) and the enable flag 54 from enable module 42. Gear enable module 44 evaluates the transmission gear 56. If the enable flag 54 is TRUE and the transmission 14 (FIG. 1) is operating in a proper gear to enable pulsing of a clutch, gear enable module 44 enables the pulse determination module 46 by setting a pulse enable flag 58 to TRUE. Pulse determination module 46 receives the transmission temperature 60, a current calculated line pressure 62, and the enable flag 58. Pulse determination module 46 calculates a pulse on time 66 from a learned volume of the clutch and a state of convergence to the volume. The learned volume of the clutch and the state of convergence of the volume are calculated based on the transmission temperature 60 and the current line pressure 62. Pulse determination module 46 also calculates a pulse off time 68 and an adequate pulse number 70 based on the transmission temperature 60.

Clutch pressure module 48 receives the pulse on time 66, the pulse off time 68, and the pulse number 70. Clutch pressure module 48 commands line pressure 72 at a maximum value according to the pulse on and off times 66,68 and the number of pulses 70. Clutch pressure module keeps a pulse count 74 of the number of pulses completed. Shift delay module 50 receives engine speed sensed from the engine 12 (FIG. 1), the transmission gear 56, and the pulse count 74. If the pulse count 74 is not equal to a desired number of pulses for the current gear 56, shift delay module 50 delays the transmission 14 (FIG. 1) from shifting to the next higher gear (upshifting) by sending a commanded gear signal 78 to maintain the current gear. Shift delay module 50 delays the shift as long as the engine speed 76 does not indicate an overspeed condition. Shift delay module 50 further delays subsequent upshifts after the pulse count 74 indicates the pulses have completed to ensure adequate shift spacing.

Figure 4:
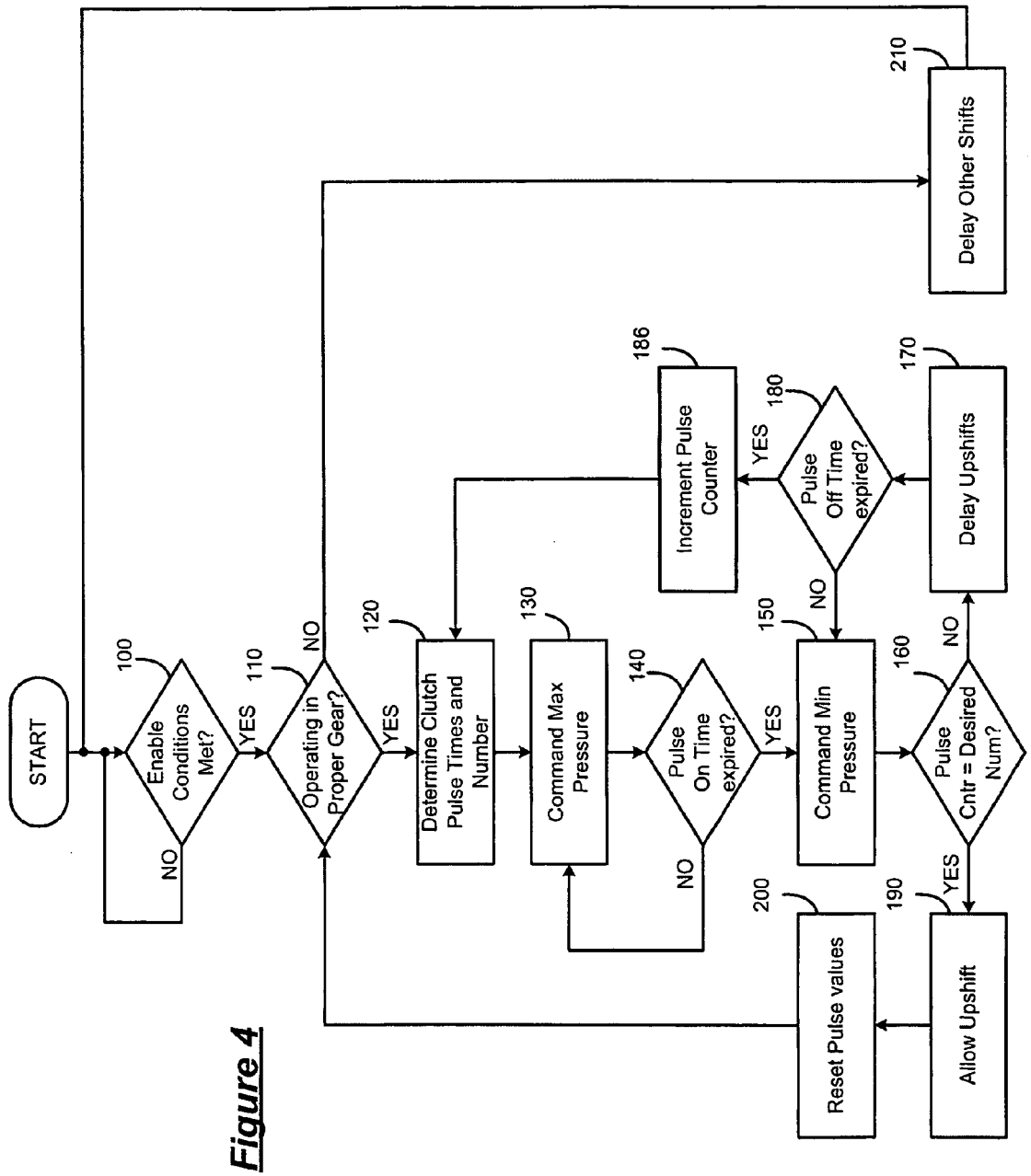
FIG. 4 is a flowchart illustrating steps performed by the control module.

Referring now to FIG. 4, a flowchart illustrating steps of the air purge method according to the present invention is shown. The air purge method is continually performed throughout a key cycle. In step 100, control determines whether enable conditions are met. If a new key cycle has occurred or the range indicates park or neutral for a selected period of time, enable conditions are met and control continues with step 110. Otherwise control loops back and continues to monitor the enable conditions. In step 110, control determines whether the transmission is operating in the proper gear to pulse the clutch on and off. In the example of pulsing C3 on and off, the proper gears would be first gear and second gear. If the transmission is in the proper gear, control continues with step 120.

In step 120, control calculates a pulse on and off time and pulse number based on a learned clutch volume, an adaptive convergence state, and the transmission temperature. In step 130, control commands maximum pressure. If the pulse on time has expired in step 140, control continues with step 150. If the pulse on time has not expired in step 140, control continues commanding maximum pressure in step 130. Once the pulse on time has expired, control commands pressure off in step 150.

In step 160, control determines whether a desired number of pulses has completed for that gear. If the desired number of pulses has not completed, control delays an upshift from occurring in step 170 by commanding the current gear to be maintained. Control then evaluates the pulse off time in step 180. If the pulse off time has not expired control continues to command pressure off in step 150. If the pulse off time has expired, control increments a pulse counter in step 186 and loops back to step 120 where a new pulse on and off time and pulse number is calculated. Control then continues to pulse the clutch on and off until a desired number of pulses has completed.

In step 160, if the pulse counter equals the desired number of pulses, the upshift is allowed in step 190 and the pulse values are reset to zero in step 200. Control then loops back to step 110 where the transmission gear is evaluated. If the transmission is still operating in the proper gear for pulsing, control continues to pulse the clutch as stated in the steps above. Otherwise, the transmission 14 (FIG. 1) has shifted to a gear in which pulsing of the clutch is not desired. In the exemplary embodiment, this is third gear because C3 is required to be fully applied for the operation of third gear. Once the transmission 14 (FIG. 1) is not operating in the desired gear, control delays any subsequent upshifts based on the time delay created by the pulsing in step 210. This delay time can be selectable. The delay prevents undesireable shifts occurring one right after another. Control then loops back to step 100 where the enable conditions are evaluated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A controller system for pulsing a clutch of an automatic transmission, comprising:
    a temperature signal input device that receives a temperature signal corresponding to a transmission fluid temperature; and
    a pulse determination module that calculates a pulse on time based a clutch volume and a state of adapted convergence and a pulse off time based on transmission fluid temperature and that determines a desired pulse number based on the transmission fluid temperature; and
    a pressure module that commands a pressure signal to pulse a clutch based on said pulse on time and said pulse off time and wherein said pulses are commanded before the clutch is applied for gear operation.

2. The system of claim 1 further comprising a shift delay module that delays the transmission from upshifting by commanding a current gear until the desired number of pulses has occurred.

3. The system of claim 2 wherein said shift delay module delays subsequent upshifts of the transmission based on a selectable period of time.

4. The system of claim 2 further comprising an engine speed signal input device that receives an engine speed signal corresponding to a speed of the engine, and wherein said shift delay module delays the upshift if the engine speed signal does not indicate an engine overspeed condition.

5. The system of claim 1 further comprising an enable module that enables the pulse determination module to command pressure to pulse the clutch once per key cycle.

6. The system of claim 5 further comprising a range signal input device that receives a range signal from a range selection device and wherein the enable module enables said pulse determination module to pulse the clutch if the range signal indicates the transmission was in at least one of park and neutral for a selectable period of time.

7. The system of claim 1 further comprising a gear enable module that receives a current gear and enables said pulse determination module to pulse the clutch if the current gear is a desired gear, and wherein the desired gear is any gear previous to the gear in which the clutch is required for operation.

* * * * *